United States Patent [19]
Barlage

[11] Patent Number: 5,168,436
[45] Date of Patent: Dec. 1, 1992

[54] UNINTERRUPTIBLE POWER SUPPLY

[75] Inventor: Francis M. Barlage, Tucson, Ariz.

[73] Assignee: Allied-Signal Inc., Morris Township, Morris County, N.J.

[21] Appl. No.: 588,223

[22] Filed: Sep. 26, 1990

[51] Int. Cl.$^5$ ............................................. H02M 3/335
[52] U.S. Cl. ........................................ 363/21; 363/97; 363/131; 307/46; 307/66
[58] Field of Search .................. 307/46, 48, 66, 82; 363/20, 21, 56, 71, 97, 131

[56] References Cited

U.S. PATENT DOCUMENTS

| | | | |
|---|---|---|---|
| 4,593,213 | 6/1986 | Vesce et al. | 363/21 |
| 4,719,550 | 1/1988 | Powell et al. | 307/66 |
| 4,745,299 | 5/1988 | Eng et al. | 363/21 |
| 4,748,342 | 5/1988 | Dij Kmans | 307/66 |
| 4,763,014 | 8/1988 | Model et al. | 307/46 |
| 4,788,451 | 11/1988 | Stoet | 307/48 |
| 4,916,329 | 4/1990 | Dang et al. | 307/66 |

OTHER PUBLICATIONS

Tech. Paper Entitled "Current Mode Controlled Bidirectional Flyback Converter", Written By K. Venkatesan Dated Jun. 26, 1989.

Primary Examiner—Steven L. Stephan
Assistant Examiner—Jeffrey L. Sterrett
Attorney, Agent, or Firm—Joseph R. Black; Robert A. Walsh

[57] ABSTRACT

An electronic switching power supply (10) is adapted to provide uninterrupted power during transient glitches in a voltage input received from a primary power source. The power supply (10) comprises a transformer (12) having two primary windings (WP1, WP2). Current flow through the first primary (WP1) is enabled during normal operation while current flow through the second primary (WP2) is disabled. When a transient glitch in the voltage input is sensed, current flow from a storage capacitor (126) through the second primary (WP2) is enabled.

8 Claims, 3 Drawing Sheets

UNINTERRUPTIBLE POWER SUPPLY

The disclosure of U.S. patent application Ser. No. 495,828, filed on Mar. 19, 1990, is incorporated herein by reference thereto.

TECHNICAL FIELD

This invention relates generally to uninterruptible power supplies, and more specifically to switching power supplies adapted to provide uninterrupted power during transient interruption in an input provided by a primary power source.

BACKGROUND OF THE INVENTION

Some electronic switching power supplies must provide for normal operation during transient interruptions in a primary power source. In certain military applications, for example, the required holdup period is fifty milliseconds. Such power supplies typically employ a capacitor bank on the output side of the transformer to provide the auxiliary power required during the holdup period.

Vesce et al U.S. Pat. No. 4,593 213 is illustrative of the prior art. During normal operation a capacitor bank 148 is charged from a secondary winding 224. An interruption in the primary input voltage is sensed by a monitoring circuit 164 which enables a holdup enable circuit 160. The enable circuit 160 in turn enables a holdup transfer switch 152, which permits current flow from the capacitor bank 148 to the primary input line 110. Current flow from the primary input line 110 through the primary winding 200 is then modulated in a conventional manner using a FET 202 and switching regulator 114.

A shortcoming of the method described in the above-cited patent is that it limits energy transfer efficiency. Efficiency is limited due to series resistance in the loop between the capacitor bank 148 and the primary winding.

An objective of the present invention is to provide a switching power supply which is operable to provide substantially uninterrupted power during a holdup period of at least fifty milliseconds while achieving an energy transfer efficiency of at least ninety percent.

SUMMARY OF THE INVENTION

This invention achieves the forementioned objective by providing a power supply with two primary windings for the transformer, and two associated switches operable to modulate current flow through the primary windings. One switch is regulated in a conventional manner during normal operation so as to enable and modulate current flow from a relatively low-voltage power source through the primary winding associated with that switch. The second switch is connected through the second primary winding a relatively high-voltage storage capacitor or capacitor bank, but is regulated so as to disable current flow from the capacitor through the winding during normal operation, and to enable and modulate the same during the holdup period. Since current flows directly from the capacitor to the second primary winding, little energy is lost in the bidirectional energy conversion process.

Attainment of a substantially glitch-free transfer from normal operation to holdup mode is enabled by the provision of first and second means for sensing current flow through the first and second primary windings, respectively, and by interconnection of the current sensing means at a summing junction. A suitably designed and connected switching regulator can then employ a signal received from the summing junction to minimize or prevent perturbation in the output of the transformer when the power supply begins running off the energy stored in the capacitor.

DESCRIPTION OF THE PREFERRED EMBODIMENT

Figure 1:
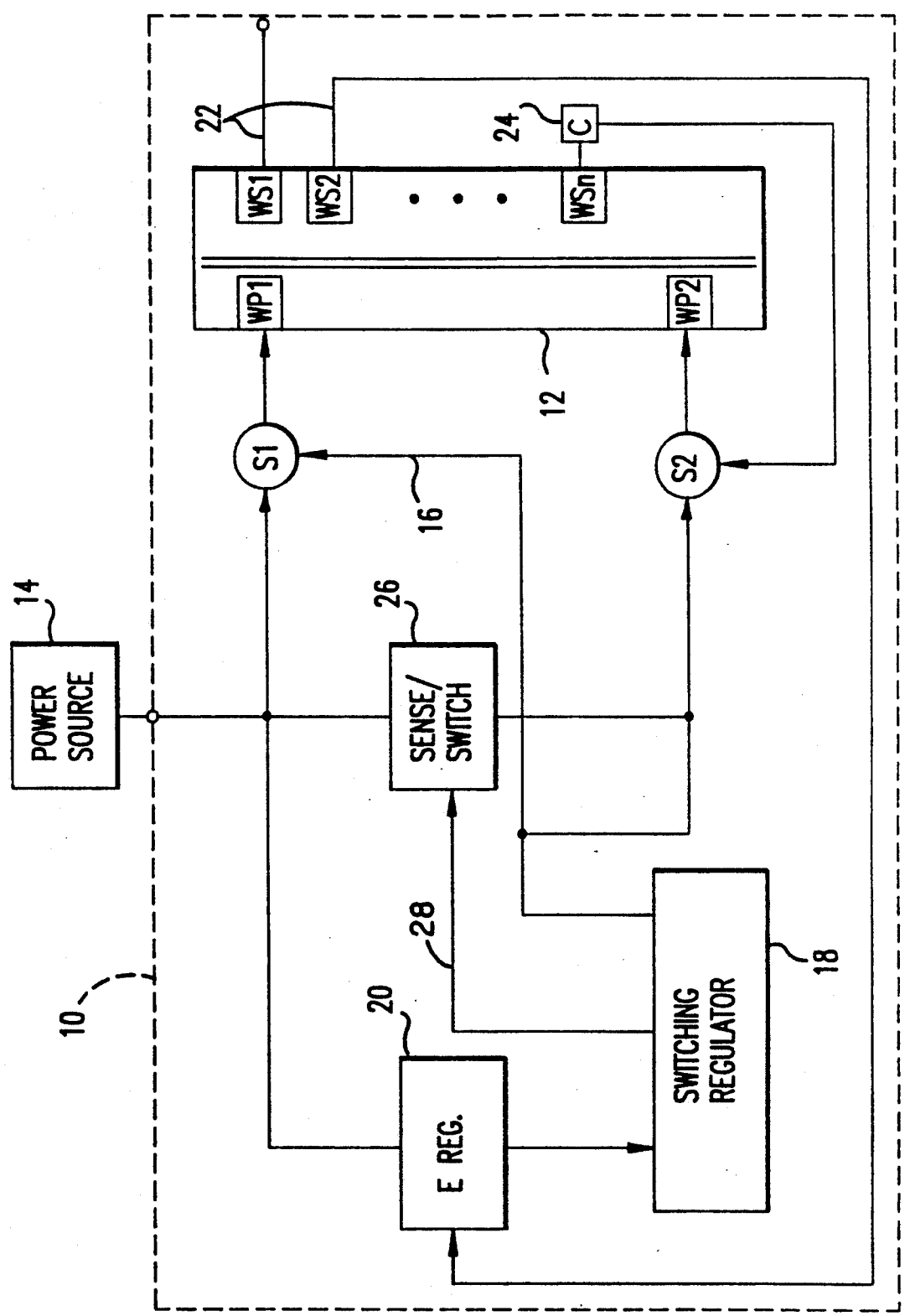
FIG. 1 is a diagrammatic illustration of the invention.

FIG. 1 schematically illustrates a generalized, switching power supply 10 incorporating the invention. A transformer 12 having first and second primary windings WP1, WP2 and a plurality of secondary windings WS1 . . . WSn (FIG. 3) receives input current from a primary power source 14. Current flow from the source 14 through the first winding WP1 is enabled by a normally open first switch S1, which is operable to modulate the current in response to a control signal 16 communicated from a switching regulator 18. Power is provided to the switching regulator 18 via a voltage regulator 20 during startup, and post-startup power is provided via the output (indicated at lines 22) of the transformer 12. A capacitor bank 24 is operatively connected to a secondary winding WPn and is charged during normal operation of the power supply 10. The stored energy in the capacitor bank 24 provides an auxiliary power source during time-limited interruptions in the input voltage provided by the primary power source 14. Current flow from the capacitor bank 24 through the second primary winding WP2 is enabled by a normally open second switch S2 which is operable to modulate the current in response to the control signal 16. Interruptions in the input voltage are detected by a sensing and switching circuit 26 which responds to the low-voltage condition and a reference voltage (indicated by line 28) communicated from the switching regulator 18 to enable communication of the control signal to the second switch S2.

Figure 2:
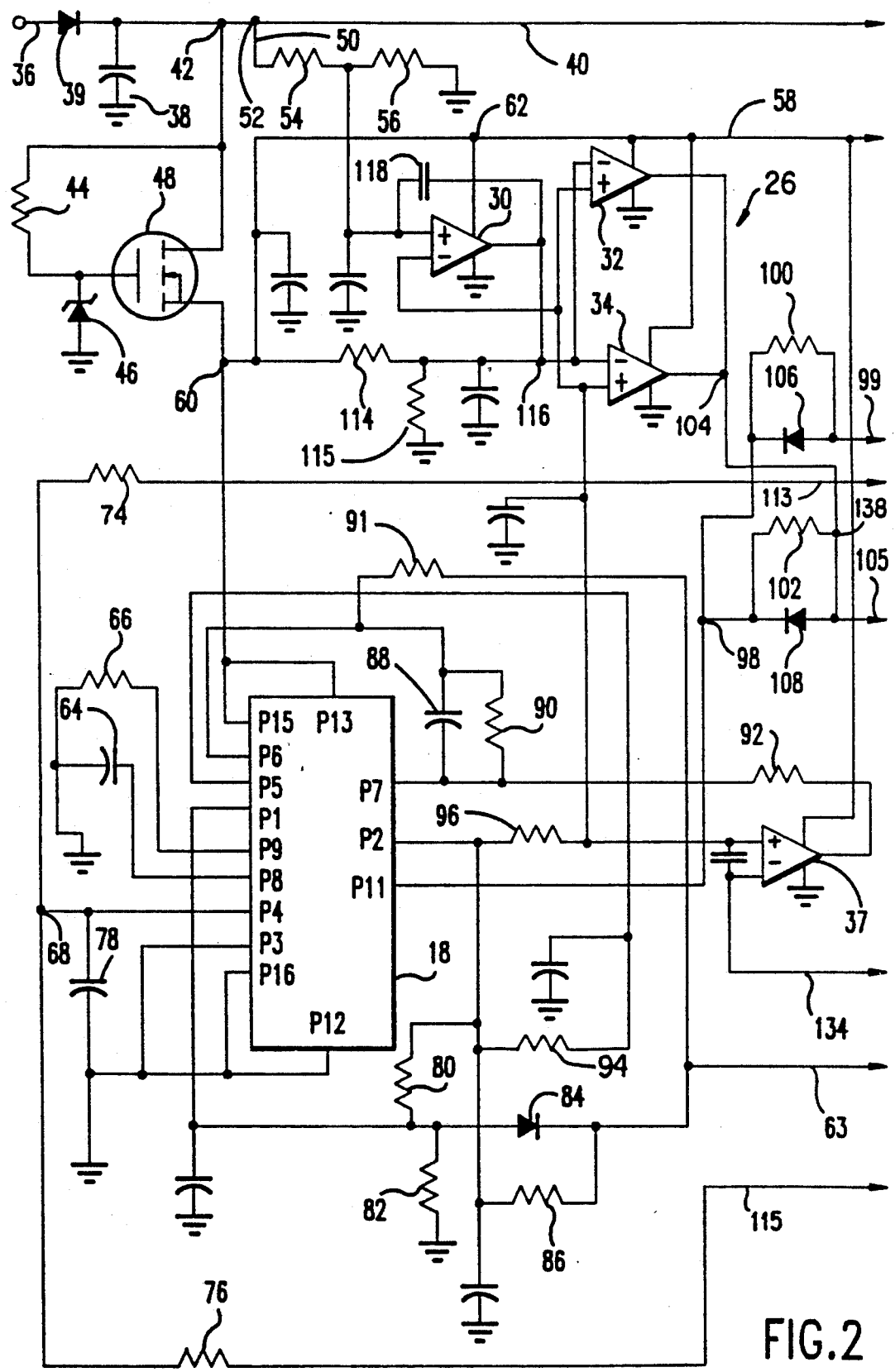
FIGS. 2 and 3 in combination provide a schematic illustration of a switching power supply according to the preferred embodiment of the invention.
Figure 3:
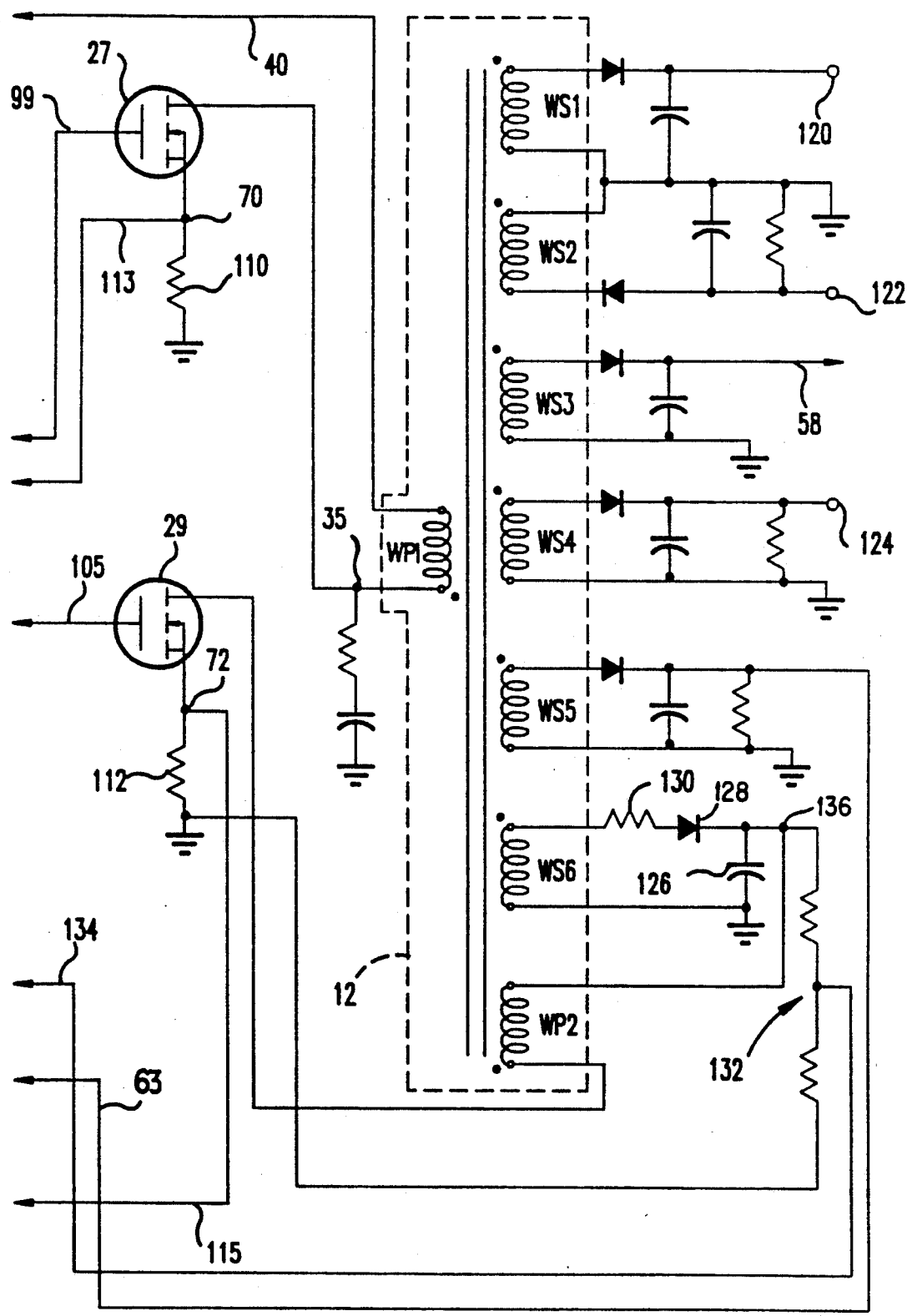

FIGS. 2 and 3 in combination illustrate the preferred embodiment of the power supply in detail. The first and second switches S1, S2 are provided in the form of field-effect transistors (FETS) 27, 29. The switching regulator 18 is provided in the form of an integrated pulse-width modulation circuit (UC 1846-Unitrode). The sensing and switching circuit 26 is provided in the form of an integrated quad-comparator circuit (LM139-National Semiconductor), three comparators 30, 32, 34 of which are used to provide the sensing and switching function, with the fourth comparator 37 being employed in an overvoltage protection loop as described hereinafter.

The power supply 10 is adapted for use with a 28-volt d.c. power source which provides input voltage at junction 36. Diode 39 is added to provide reverse voltage protection along the primary input line 40. A filter capacitor 38 is connected between the diode 39 and junction 42. Alternatively, the diode 39 can be positioned between junction 35 and the drain input to FET 27. If a bipolar transistor is substituted for FET 27, then the diode should be connected in parallel with the transistor. The primary input line 40 extends from junction 36 to one end of the first primary winding WP1 of the transformer 12. The opposite end of the winding WP1 is connected to ground via FET 27 and resistor 110. Startup power for the switching regulator 18 is provided from junction 42 via the voltage regulator 20, the latter being formed as indicated by a resistor 44, zener diode 46, and FET 48. A sensing line 50 is provided from junction 52 to the non-inverting input of comparator 30. A voltage divider formed by resistors 54 and 56 sets the predetermined input voltage level at which the FET 29 is enabled.

During normal, post-startup operation, a conditioned 15-volt output of a secondary winding WS3 is provided on line 58. Line 58 is connected to the source of FET 48 at junction 60, and to the power inputs of the comparators 30, 32, 34, 37 as indicated at junction 62. The 15-volt signal at junction 60 disables the FET 48 and provides post-startup power to the switching regulator 18.

The switching regulator 18 has sixteen pins P1-P16, two of which are not used in this application. The power input at junction 60 is received at P13 and P15. The conditioned output of secondary winding WS5 is communicated along line 63 and received as a feedback signal at P6. P8 and P9 are connections to an internal oscillator which sets the frequency of a wavetrain output at P11. The frequency is determined by an external capacitor 64 and resistor 66. P3 and P4 are connections to internal current sensing circuitry. P3 is grounded as shown, and P4 receives the current sensing input via summing junction 68. Junction 68 is connected to the sources of FETS 27 and 29 at junctions 70 and 72, respectively. Resistors 74 and 76 and capacitor 78 form low-pass filters for the input to P4. P12 and P16 are grounded as indicated. P1 is a current limit input communicated from P2. The current limit is determined by resistors 80 and 82. Diode 84 and resistor 86 implement a foldback current limiting function that is more particularly described in the above-referenced patent application. P7 is an output of an internal operational amplifier, the inverting and noninverting inputs of which are P6 and P5, respectively. P7 is connected to P6 through capacitor 88 which in conjunction with resistor 91 forms an integrator. The gain of the integrator is limited by resistor 90. P7 is also connected to the output of comparator 37 through resistor 92. P2 is a reference voltage output that is communicated to P1, to P5 through resistor 94, to the inverting input of comparator 30 through resistor 96 and to the noninverting inputs of comparators 32, 34, and 37. P11 is the pulse-width-modulated control signal outputted from the regulator 18, and is communicated to junction 98. From junction 98 the control signal is communicated along control line 99 and through resistor 100 to the gate input of FET 27. Junction 98 is also connected through resistor 102 to the gate input of FET 29 and to junction 104, the latter being the output of comparators 32 and 34. During holdup periods the control signal is operatively communicated to FET 29 along control line 105, as further described hereinafter.

Diodes 106 and 108 are connected as shown and function to increase the discharge rate of the gate-to-source capacitance for FETS 27 and 29. Resistors 110 and 112 are used to sense current flow through WP1 and WP2. The associated feedback signals are communicated to P4 along lines 113 and 115 and through summing junction 68.

Returning to the sensing and switching circuit 26, resistor 114 is connected between the output line 58 and junction 116. Junction 116 is connected to the output of comparator 30 and to the inverting inputs of comparators 32 and 34. Resistors 114 and 115 form a voltage divider which drops the voltage from line 58 to a level suitable for use with the reference voltage received at the noninverting inputs of comparators 32 and 34. Capacitor 118 is connected between the output of comparator 30 and its noninverting input to provide positive hysteresis in order to facilitate glitch-free switching.

Turning now to the transformer 12, leads from the secondary windings WS1, WS2, and WS4 are connected as shown to the indicated output circuits. These provide +15-volt, −15-volt, and +5-volt power for external loads connected at 120, 122, and 124. The output circuit connected to WS5 is adapted to provide a 5-volt signal along the feedback line 63 during normal operation. The output circuit connected to WS6 includes a high-voltage energy storage capacitor 126 connected across the WS6 winding diode 128, and resistor 130. Connected across the capacitor 126 is a voltage divider 132 adapted to provide a signal along a feedback line 134 extending to the inverting input of comparator 37. The positive side of the storage capacitor 126 is connected to the second primary winding WP2 via junction 136, and the opposite end of the winding is connected to ground via the FET 29 and resistor 112.

Operation of the power supply is as follows. Upon startup, the 28-volt primary power input is communicated through FET 48 to P13 and P15. The regulator 18 produces a reference voltage output at P2 of about 5.1 volts, and a control signal output as a voltage wavetrain at P11. The control signal from P11 enables FET 27 to modulate current flow through the first primary winding WP1. When the output voltage on line 58 is sufficiently high (approximately 13 volts), FET 48 is disabled and power to the regulator 18 is provided through the transformer 12. The voltage divider formed by resistors 54 and 56 provides a noninverting input to comparator 30 which during normal operation exceeds the reference voltage communicated to the inverting input. Accordingly, the voltage at junction 116 stays high in the absence of a low-voltage condition in the primary power input, and that voltage exceeds the reference voltage at P2. The higher inverting input to comparator 34 drives the output at junction 104 to ground. The ground at junction 104 sinks the control signal at junction 138 so that FET 29 is disabled. Comparator 32 is used in parallel with comparator 34 to add current sinking capability. The feedback signal on line 134 is approximately 4.1 volts and the inverting input to comparator 37 is lower than, the noninverting input received from P2. If an overvoltage condition occurs on line 134, the inverting input goes higher than the noninverting input, and the grounded output of comparator 37 sinks the P7 output of the regulator 18, which in turn shuts off the control signal output from P11.

The storage capacitor 126 is charged to approximately 100 volts in response to the voltage induced in WS6. When a low-voltage condition occurs on line 40, the noninverting input to comparator 30 drops to a level lower than the reference voltage. The grounded output of comparator 30 pulls down the voltage at junction 116 so that the inverting input to comparator 34 goes lower than the noninverting input. The output at junction 104 is then an open, and the control signal at junction 138 enables FET 29 to modulate current flow from storage capacitor 126 through the second primary winding WP2.

It is important to obtain a substantially glitch-free transfer from normal mode to holdup mode. That is, there should be little or no perturbation noted in the output of the transformer when the power supply begins running off the energy stored in capacitor 126. To accomplish this, the energy from the primaries WP1, WP2 that is associated with the first pulse in the control signal subsequent to transfer must be substantially the same as the energy from the first primary WP1 that is associated with the pulse immediately preceding transfer. To obtain the same energy given the WP2/WP1 turns ratio, resistors 74, 76, 110, and 112 are selected to ensure that the signal provided to P4 at summing junction 68 is the same regardless of whether it originates from the current through WP1, from the current through WP2, or from the current through both simultaneously. Resistor 130 should have a resistance which is high enough to ensure that when the current pulses through the second primary WP2 reduces the voltage across storage capacitor 126, there is no significant loss at outputs 58, 120, 122, and 124 as a consequence of recharging the storage capacitor.

Diode 39 prevents the energy stored in capacitor 126 from being transferred to the source supply input 36. If there is no load on node 36 when the input power is removed, then the diode 39 is not required, but may be desired as for circuit protection. However, if there are additional loads at 36 when the input power is removed, then diode 39 should be included where indicated or should be positioned between junction 35 and FET 27. This prevents energy transfer from WP2 to WP1 when FET 29 is pulsed. Although FET 27 is still pulsed in that event, there is little current flow through the first primary winding WP1 because the voltage on line 40 is reduced to about thirteen (or to zero when a bipolar transistor is used for FET 48).

When diode 39 is positioned as illustrated, energy from capacitor 126 during the holdup mode is transferred not only to outputs 120, 122, 58, and 124, but is also charging capacitor 38 since the polarity of the primaries WP1, WP2 is the same. By simultaneously pulsing both FET 27 and FET 29 during the holdup mode, recovery of the energy stored in capacitor 126 is maximized. Note that the direction of the charging current creates a negative signal at junction 70 due to reverse flow through FET 27. However, by proper selection of resistors 74, 76, 110, and 112 that negative signal is canceled by the positive signal at junction 72. Accordingly, the feedback signal communicated to P4 represents only the energy transferred to the output.

The reader should understand that the foregoing portion of the description, which includes the accompanying drawings, is not intended to restrict the scope of the invention to the preferred embodiment thereof or to specific details which are ancillary to the teaching contained herein. The invention should be construed as broadly as is consistent with the following claims and their equivalents.

What is claimed is:

1. Switching power supply apparatus adapted to provide substantially uninterrupted power during time-limited low-voltage conditions in a D.C. input derived from a power source, the apparatus comprising in combination:
   a transformer comprising first and second primary windings and a plurality of secondary windings;
   energy storage means connected to one of the secondary windings for storing energy in response to voltage induced in the secondary winding;
   first switching means, connected to the first primary winding and operative in response to a control signal, for modulating current flow from the power source through the first primary winding;
   second switching means, connected to the energy storage means and the second primary winding and operative in response to the control signal, for modulating current flow from the energy storage means through the second primary winding;
   regulator means operatively connected to the first and second switching means for communicating the control signal thereto;
   means operatively connected to the first switching means for sensing current flow therethrough; and
   means operatively connected to the second switching means for sensing current flow therethrough;
   the first and second sensing means being connected through a common junction to the regulator means.

2. The invention of claim 1 further comprising sensing and switching means, operatively connected to the regulator means and responsive to the voltage input provided by the power source, for preventing communication of the control signal to the second switching means when the voltage input is above a predetermined level and permitting communication of the same when the voltage input is below the predetermined level.

3. The invention of claim 2 further comprising:
   a voltage regulator connected to the regulator means and connected to receive the input from the power source; and
   an output circuit connected to a secondary winding of the transformer, to the voltage regulator, to the regulator means, and to the sensing and switching means;
   the power supply apparatus being operable to provide a voltage input to the regulator means that is communicated through the voltage regulator during startup conditions and from the output circuit during post-startup condition.

4. The invention of claim 1 wherein the energy storage means consists essentially of a capacitor.

5. Switching power supply apparatus adapted to provide substantially uninterrupted power during time-limited low-voltage conditions in a D.C. input derived from a power source, the apparatus comprising in combination;
   a transformer comprising first and second primary windings and a plurality of secondary windings;
   energy storage means connected to one of the secondary windings for storing energy in response to voltage induced in the secondary winding;
   first switching means, connected to the first primary winding and operative in response to a control signal, for modulating current flow from the power source through the first primary winding;
   second switching means, connected to the energy storage means and the second primary winding and operative in response to the control signal, for modulating current flow from the energy storage means through the second primary winding;
   first voltage divider means operatively connected to the first switching means for sensing current flow therethrough; and second voltage divider means operatively connected to the second switching means for sensing current flow therethrough;

the first and second voltager divider means being interconnected at a common junction.

6. The invention of claim 5 further comprising regulator means operatively connected to the first and second switching means for communicating the control signal thereto, the first and second voltage divider means being connected through the common junction to the regulator means.

7. The invention of claim 6 further comprising sensing and switching means, operatively connected to the regulator means and responsive to the voltage input provided by the power source, for preventing communication of the control signal to the second switching means when the voltage input is above a predetermined level and permitting communication of the same when the voltage input is below the predetermined level.

8. The invention of claim 6 wherein the energy storage means consists essentially of a capacitor.

* * * * *